US008749729B2

(12) United States Patent
Sasaki et al.

(10) Patent No.: US 8,749,729 B2
(45) Date of Patent: Jun. 10, 2014

(54) LIGHT GUIDE PLATE, SURFACE-EMITTING APPARATUS, LIQUID CRYSTAL DISPLAY APPARATUS, AND METHOD OF PRODUCING A LIGHT GUIDE PLATE

(75) Inventors: Jun Sasaki, Tokyo (JP); Yasuyuki Kudo, Tokyo (JP); Makoto Aoki, Tokyo (JP); Yosihide Nagata, Tokyo (JP); Mariko Fukuda, Tokyo (JP); Masahiro Ochiai, Tokyo (JP)

(73) Assignee: Sony Corporation, Tokyo (JP)

( * ) Notice: Subject to any disclaimer, the term of this patent is extended or adjusted under 35 U.S.C. 154(b) by 543 days.

(21) Appl. No.: 12/594,900

(22) PCT Filed: Feb. 6, 2009

(86) PCT No.: PCT/JP2009/052114
§ 371 (c)(1),
(2), (4) Date: Mar. 5, 2010

(87) PCT Pub. No.: WO2009/099219
PCT Pub. Date: Aug. 13, 2009

(65) Prior Publication Data
US 2010/0214509 A1 Aug. 26, 2010

(30) Foreign Application Priority Data
Feb. 7, 2008 (JP) ................................. 2008-027331

(51) Int. Cl.
*G02F 1/13357* (2006.01)
(52) U.S. Cl.
USPC ............................................ 349/65; 385/146
(58) Field of Classification Search
None
See application file for complete search history.

(56) References Cited

U.S. PATENT DOCUMENTS

| 7,350,957 B2* | 4/2008 | Liao ............................. 362/621 |
| 2004/0114345 A1* | 6/2004 | Kim et al. ..................... 362/31 |
| 2004/0114348 A1* | 6/2004 | Lin ................................ 362/31 |
| 2004/0145915 A1* | 7/2004 | Kim et al. ..................... 362/559 |
| 2005/0030730 A1* | 2/2005 | Ohkawa et al. ................ 362/31 |
| 2005/0094961 A1* | 5/2005 | Cheng .......................... 385/146 |
| 2006/0039670 A1* | 2/2006 | Feng et al. .................... 385/146 |
| 2006/0082884 A1* | 4/2006 | Feng et al. .................... 359/569 |
| 2007/0127261 A1* | 6/2007 | An et al. ....................... 362/608 |
| 2007/0147074 A1* | 6/2007 | Sakai et al. ................... 362/608 |
| 2008/0137373 A1* | 6/2008 | Li ................................. 362/620 |

FOREIGN PATENT DOCUMENTS

| EP | 2 048 437 | | 4/2009 |
| JP | 2001-243825 | | 9/2001 |
| JP | 2001-300954 A | * | 10/2001 |
| JP | 2002-169032 A | * | 6/2002 |

(Continued)

OTHER PUBLICATIONS

International Search Report dated May 19, 2009, for corresponding Patent Application PCT/JP2009/052114.

*Primary Examiner* — Mike Stahl
(74) *Attorney, Agent, or Firm* — K&L Gates LLP

(57) ABSTRACT

A light guide plate includes a light-emitting surface, a light-reflecting surface opposed to the light-emitting surface, and a light-incident surface including a protrusion formed continuously along an edge portion of the light-emitting surface. Accordingly, light that has entered the protrusion is transmitted through the protrusion and totally reflected on an inner surface of the light-emitting surface to thus propagate inside the light guide plate. As described above, since incident light components emitted toward an upper portion of the light-incident surface can be effectively blocked by the protrusion, luminance distribution characteristics as well as a light use efficiency can be improved. The light guide plate is produced by a punching press process.

10 Claims, 11 Drawing Sheets

(56) References Cited

FOREIGN PATENT DOCUMENTS

| JP | 2002-196151 | | | 7/2002 |
| JP | 2004-296346 | | | 10/2004 |
| JP | 2006-210108 | A | * | 8/2006 |
| JP | 2007-176137 | A | * | 7/2007 |
| JP | 2005-228718 | | | 8/2008 |
| WO | 2008/013304 | | | 1/2008 |

* cited by examiner (A)

(B)

(C)

LIGHT GUIDE PLATE, SURFACE-EMITTING APPARATUS, LIQUID CRYSTAL DISPLAY APPARATUS, AND METHOD OF PRODUCING A LIGHT GUIDE PLATE

CROSS REFERENCE TO RELATED APPLICATIONS

The present application is a National Stage of International Application No. PCT/JP2009/052114 filed on Feb. 6, 2009 and which claims priority to Japanese Patent Application No. 2008-027331 filed on Feb. 7, 2008, the entire contents of which are being incorporated herein by reference.

BACKGROUND

The present disclosure relates to a light guide plate used in an edge-light-type backlight unit, a surface-emitting apparatus and liquid crystal display apparatus equipped with the light guide plate, and a method of producing a light guide plate.

A liquid crystal display (LCD) apparatus can realize low power consumption, miniaturization, and thinning as compared to a cathode ray tube (CRT), and those of various sizes are currently widely used in apparatuses ranging from small-size apparatuses such as a cellular phone, a portable game device, a digital camera, and a PDA (Personal Digital Assistants) to a large-size liquid crystal television.

Liquid crystal display apparatuses are categorized into a transmission type, a reflection type, and the like. In particular, a transmission-type liquid crystal display apparatus includes a liquid crystal display panel and a backlight unit as an illumination light source. As backlight units, there is an edge-light type in addition to a direct type in which a light source is disposed right below a liquid crystal display panel. The edge-light-type backlight unit is constituted of a light guide plate disposed on a back surface of the liquid crystal display panel, a light source disposed on a side surface of the light guide plate, a reflector plate that covers a surface on the other side of a light-emitting surface of the light guide plate, and the like.

Conventionally, for a light source used in those types of backlight units, a cold cathode fluorescent lamp (CCFL) that emits white light is widely used. Particularly in recent years, a backlight unit that uses a light-emitting diode (LED) as a light source is highly expected to be used for a mobile display of a cellular phone and the like.

In the edge-light-type backlight unit, light that has been emitted from a light source enters a light guide plate from an incident surface of the light guide plate and propagates inside the light guide plate while repeating a total reflection on an emitting surface and a reflecting surface of the light guide plate. During the propagation, light is diffused by a diffusion pattern formed on the reflecting surface and emitted from the emitting surface when an incidence angle with respect to the emitting surface becomes a critical angle or less, thus becoming illumination light of the liquid crystal display panel. To obtain optical characteristics as described above, a design of the light guide plate is optimized.

On the other hand, in the edge-light-type backlight unit, a light use efficiency and an in-plane luminance distribution are required to be improved. Specifically, it is necessary to cause light emitted from the light source to efficiently enter the light guide plate and prevent light that has propagated inside the light guide plate from leaking outwardly. Moreover, when an LED is used as the light source, light emitted from the light source is propagated inside the light guide plate while spreading like a fan from the incident surface of the light guide plate. Consequently, an area where light is not propagated is apt to be caused inside the light guide plate, with the result that it is difficult to uniformly emit light from the emitting surface of the light guide plate by merely optimizing a design of the light guide plate.

For solving the problem described above, Patent Document 1, for example, discloses a technique of roughening an incident surface of a light guide plate so that a light diffusion at the incident surface is used for reducing luminance unevenness. In addition, Patent Documents 2 and 3 disclose techniques of providing prisms or curved asperities on a light-incident surface of a light guide plate to reduce luminance unevenness.

Patent Document 1: Japanese Patent Application Laid-open No. 2001-243825
Patent Document 2: Japanese Patent Application Laid-open No. 2002-196151
Patent Document 3: Japanese Patent Application Laid-open No. 2005-228718

In the light guide plate disclosed in Patent Document 1, since light from the light source is forcibly diffused nondirectionally at a time the light enters, a traveling direction of the incident light also becomes nondirectional, and the light is diffused not only in a surface direction of the light guide plate but also in a thickness direction. As a result, light that is supposed to travel inside the light guide plate by a total reflection exits the light guide plate from the side surfaces or the back surface, and a light use efficiency is therefore lowered, which is a problem.

Further, in the light guide plates of Patent Documents 2 and 3, the light-incident surface is not flat since prisms or curved asperities are formed thereon, thus leading to a problem that light cannot enter the light guide plate efficiently due to a refraction or reflection of light at the concavoconvex portions. Therefore, also with this structure, it is difficult to improve a light use efficiency and a luminance distribution.

Furthermore, since there is a demand for additional thinning of a liquid crystal display apparatus in a field of a portable information terminal typified by a cellular phone or a portable game device in recent years, thinning of a light guide plate may become an essential agenda. However, a light incidence efficiency with respect to the incident surface lowers along with thinning of the light guide plate, and it becomes increasingly difficult to improve a light use efficiency and luminance distribution characteristics.

Therefore, it is desired to provide a light guide plate, a surface-emitting apparatus, a liquid crystal display apparatus, and a method of producing a light guide plate with which a light use efficiency and luminance distribution characteristics can be improved and that can cope with thinning.

SUMMARY

According to an embodiment, there is provided a light guide plate including a light-emitting surface, a light-reflecting surface, and a light-incident surface.

The light-reflecting surface is opposed to the light-emitting surface. The light-incident surface includes a protrusion. A protrusion amount of the protrusion gradually decreases from the light-emitting surface side toward the light-reflecting surface side. The protrusion is formed at an end portion on the light-emitting surface side.

Further, according to an embodiment of the present invention, there is provided a surface-emitting apparatus including a light guide plate and a light source.

The light guide plate includes a light-emitting surface, a light-reflecting surface, and a light-incident surface. The light-reflecting surface is opposed to the light-emitting surface. The light-incident surface includes a protrusion. A protrusion amount of the protrusion gradually decreases from the light-emitting surface side toward the light-reflecting surface side. The protrusion is formed at an end portion on the light-emitting surface side.

The light source is disposed on the light-incident surface of the light guide plate.

Furthermore, according to an embodiment, there is provided a liquid crystal display apparatus including a light guide plate, a light source, and a liquid crystal display device.

The light guide plate includes a light-emitting surface, a light-reflecting surface, and a light-incident surface. The light-reflecting surface is opposed to the light-emitting surface. The light-incident surface includes a protrusion. A protrusion amount of the protrusion gradually decreases from the light-emitting surface side toward the light-reflecting surface side. The protrusion is formed at an end portion on the light-emitting surface side.

The light source is disposed on the light-incident surface of the light guide plate.

The liquid crystal display device is disposed on the light-emitting surface side of the light guide plate.

Since the light guide plate includes the protrusion having the structure described above at the end portion of the light-incident surface on the light-emitting surface side, when a height of the light source is equal to or larger than a thickness dimension of the light guide plate, a gap corresponding to a protrusion length of the protrusion is formed between the light-incident surface and the light source. Since light emitted from a light-emitting diode as the light source normally has a directivity, light propagates inside the light guide plate in a fan-like manner from the light-incident surface. By forming a protrusion in the light guide plate, light emitted from the light source to enter the light-incident surface can be made to enter the light-incident surface while being spread a certain degree. Accordingly, a directivity of incident light L can be relieved, and a generation of a bright spot on the light-incident surface at a position where the light source is disposed can be suppressed as compared to a case where the light source is disposed while being in contact with the light-incident surface.

Moreover, because light can be diffused in a wide range in the vicinity of the light-incident surface, it becomes possible to increase an amount of light that propagates among four corner positions of the light guide plate and the light sources, enhance uniformity of light that is transmitted inside the light guide plate, and improve an in-plane luminance distribution. Furthermore, since an amount of light that directly reaches side surfaces on both sides orthogonal to the light-incident surface and a side surface opposed to the light-incident surface can be reduced, an amount of light that is transmitted outwardly through those side surfaces is reduced. As a result, it becomes possible to improve a light use efficiency.

Further, by providing the protrusion to the light-incident surface, light that has entered the protrusion is transmitted through the protrusion and totally reflected by an inner surface of the light-emitting surface, to thus be propagated inside the light guide plate. As described above, because incident light components emitted toward an upper portion of the light-incident surface can be effectively blocked by the protrusion, a light use efficiency can be improved. It should be noted that instead of being formed continuously on the light-incident surface along an edge portion of the light-emitting surface, the protrusion may be formed intermittently on the light-incident surface along the edge portion of the light-emitting surface.

The light guide plate exhibits a prominent effect also when it is formed thin. In other words, since the protrusion can effectively exhibit its function when a thickness of the light guide plate at the light-incident surface portion is equal to or smaller than a height (thickness) of the light source, it becomes possible to simultaneously realize improvements of a light use efficiency and luminance distribution characteristics.

The light-incident surface may be a prism surface constituted of a plurality of rows of prisms arranged along a longitudinal direction thereof.

Accordingly, a light diffusion effect in the light-incident surface is enhanced, and luminance unevenness can be reduced. The light-incident surface is not limited to the prism surface and may have other lens configurations.

On the other hand, according to another embodiment, there is provided a light guide plate including a light-emitting surface, a light-reflecting surface, and four side surfaces including a light-incident surface.

The light-reflecting surface is opposed to the light-emitting surface. The side surfaces each include a protrusion. A protrusion amount of each of the protrusions gradually decreases from the light-emitting surface side toward the light-reflecting surface side. Each of the protrusions is formed at an end portion on the light-emitting surface side.

By forming the protrusions on the four side surfaces including the light-incident surface, it becomes possible to capture, by the protrusions, light that is propagated in a front direction in a gap between the side surfaces of the light guide plate and a reflector plate and cause the light to reenter the light guide plate. Accordingly, a biased rise of luminance at a circumferential edge portion of the light guide plate can be relieved.

In the light guide plate, the light-incident surface may be structured to include a large number of streaky concave portions extending from the light-reflecting surface side toward the light-emitting surface side. Accordingly, it becomes possible to suppress a light diffusion in the thickness direction of the light guide plate and lowering of a total reflection efficiency of light that is transmitted through the light guide plate, and improve in-plane uniformity of an emission intensity without lowering a light use efficiency.

Furthermore, in this structure, the light-incident surface may be structured to have a certain roughness degree. By roughening the light-incident surface, incident light can be somewhat scattered in the light-incident surface to lose its directivity. As a result, it becomes possible to realize a uniform light transmission distribution inside the light guide plate. Moreover, due to an adequately-random distribution of the surface roughness of the light-incident surface in the longitudinal direction, the effect described above can be additionally enhanced.

According to an embodiment, there is provided a method of producing a light guide plate, including preparing a plastic sheet made of a translucent resin. By punching out the plastic sheet in a shape of a frame, a light guide plate is shaped. Accordingly, a light guide plate including a punched-out cross section that has a protrusion formed continuously along an edge portion of one surface of the plastic sheet can be produced.

In the method of producing a light guide plate, the light guide plate is produced by a punching press method. Therefore, an ultra-thin light guide plate of, for example, 0.30 mm or less, that cannot be produced by an injection molding method, can be easily produced. Moreover, it is possible to significantly improve productivity as well as suppress a cost of the production of a light guide plate at a low cost. In addition, by changing a size of a punching blade, it is possible to easily cope with productions of light guide plates that support various screen sizes. Furthermore, the light guide plate can be provided for practical use with the side surfaces being used as they are as punched-out cross sections, without any particular processing after the punching.

As described above, according to the present embodiment, a light guide plate, a surface-emitting apparatus, and a liquid crystal display apparatus with which a light use efficiency and luminance distribution characteristics can be improved and that can cope with thinning can be obtained.

Additional features and advantages are described herein, and will be apparent from, the following Detailed Description and the figures.

BRIEF DESCRIPTION OF THE FIGURES

FIG. 9 Side views of a main portion of the light-incident surface of the light guide plate, in which FIG. 9(A) shows a case where a protrusion is not provided and FIG. 9(B) shows a case where the protrusion is provided.

FIG. 15 Simulation results showing a luminance distribution of an emitting surface of the light guide plate, in which FIG. 15(A) shows an example of a light guide plate that does not have a protrusion on the light-incident surface and FIG. 15(B) shows an example of a light guide plate that has a protrusion on the light-incident surface.

DETAILED DESCRIPTION

Hereinafter, embodiments will be described with reference to the drawings.

Figure 1:
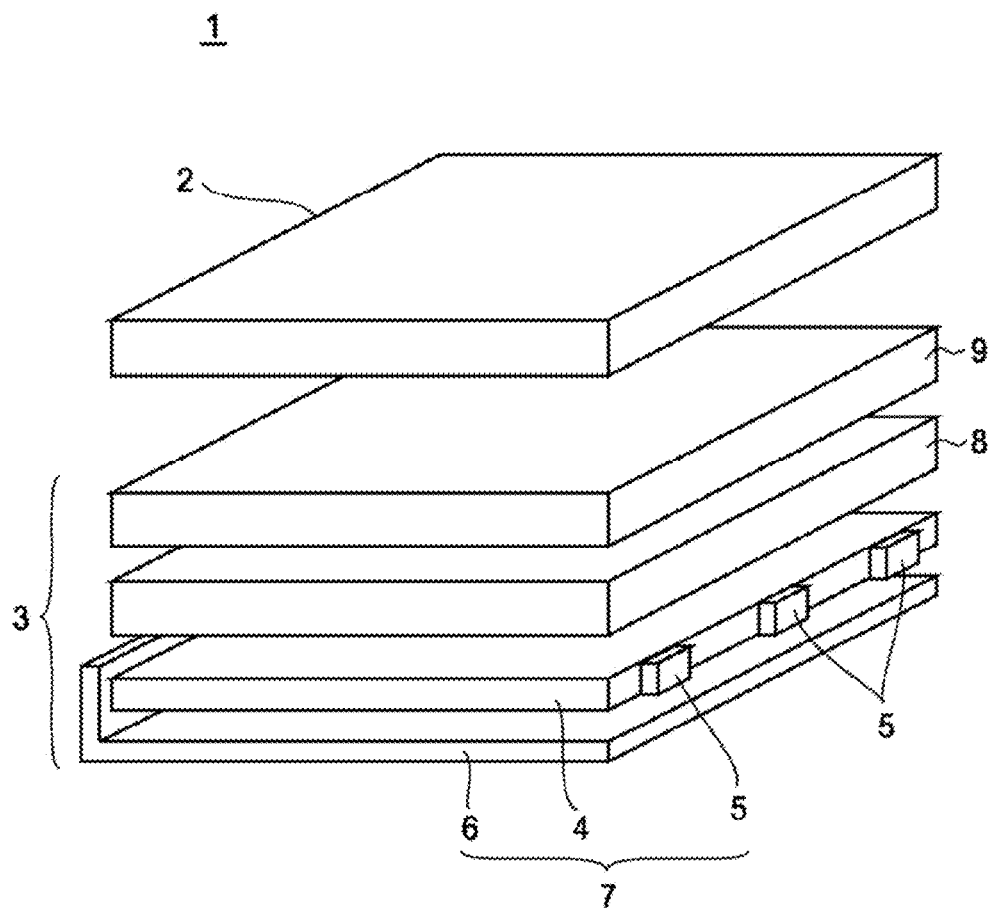
FIG. 1 A perspective view schematically showing a structure of a liquid crystal display apparatus according to an embodiment.

FIG. 1 is a perspective view schematically showing a structure of a liquid crystal display apparatus 1 according to an embodiment. First, an overall structure of the liquid crystal display apparatus 1 will be described.

The liquid crystal display apparatus 1 of this embodiment includes a liquid crystal display panel 2 and a surface-emitting apparatus 3 that illuminates the liquid crystal display panel 2 from a back side. The surface-emitting apparatus 3 includes a backlight unit 7 constituted of a light guide plate 4, light sources 5, and a reflector plate 6, a diffusion sheet 8, and a suitable optical sheet such as a light collection sheet 9 typified by a prism sheet or a lens sheet.

The liquid crystal display panel 2 has a structure in which a liquid crystal layer is interposed between a pair of transparent substrates. A drive mode of the liquid crystal display panel 2 is not particularly limited, and VA (Vertical Alignment), IPS (In Plane Switching), TN (Twisted Nematic), and the like are applicable. The liquid crystal display panel 2 includes a first polarizer (polarization plate) disposed on a light-incident side and a second polarizer (polarization plate) disposed on a light-emitting side. Further, the liquid crystal display panel 2 includes a color filter (not shown) for displaying a color image. It should be noted that the liquid crystal display panel 2 is structured to include a phase difference film for optically compensating a birefringence of the liquid crystal layer and the like as necessary.

The backlight unit 7 is constituted of an edge-light-type backlight unit. The backlight unit 7 includes the light guide plate 4 made of a translucent material, the light sources 5 disposed on one side surface portion of the light guide plate 4, the reflector plate 6 that covers a surface on the other side of the light-emitting surface of the light guide plate 4, and the like. The reflector plate 6 includes a reflection sheet, a mirror-surface metal frame, a resin frame of, for example, white, that has high reflectivity, and the like. The light sources 5 are constituted of a plurality of point light sources such as LEDs (Light-Emitting Diodes). It should be noted that a line light source such as a fluorescent tube may be used instead.

Figure 2:
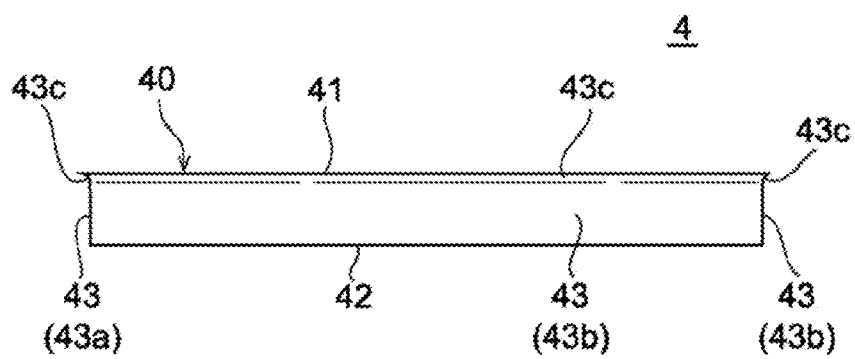
FIG. 2 A side view of a light guide plate constituting the liquid crystal display apparatus shown in FIG. 1.
Figure 3:
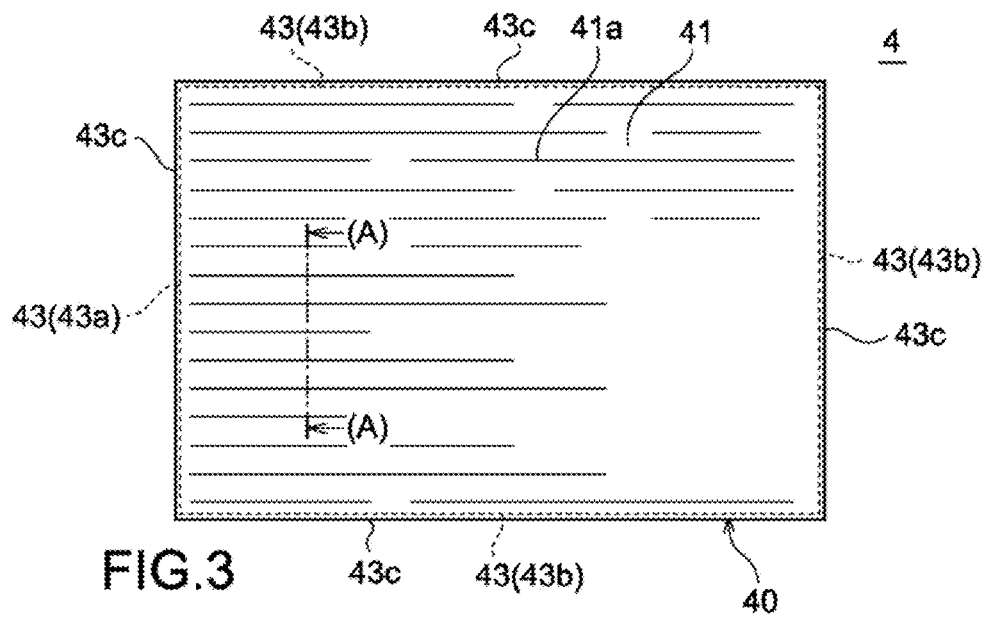
FIG. 3 A plan view of the light guide plate.
Figure 4:
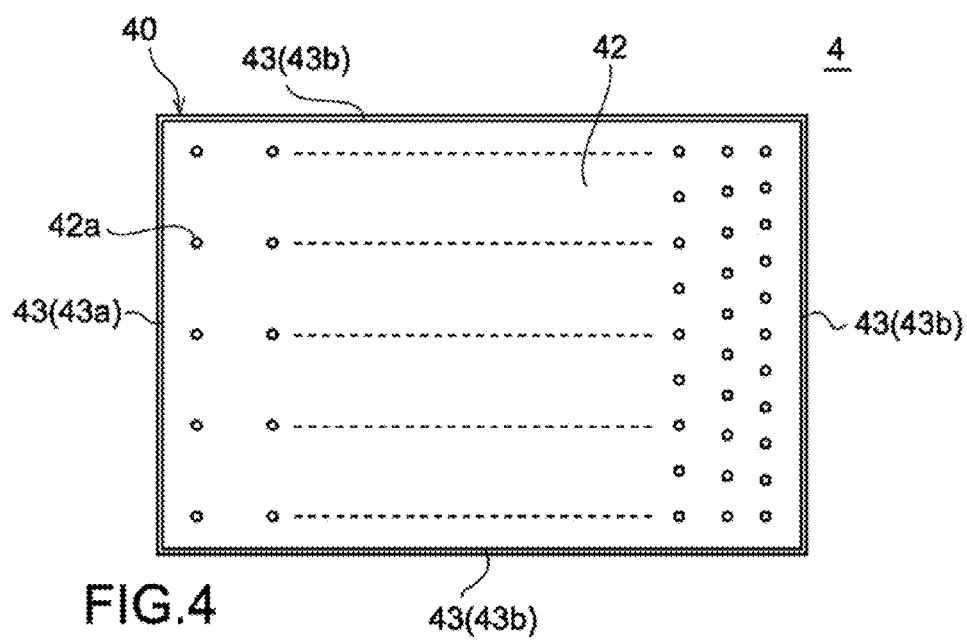
FIG. 4 A bottom view of the light guide plate.
Figure 5:
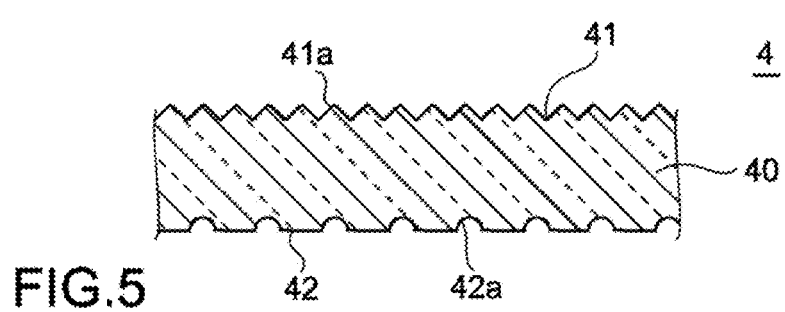
FIG. 5 A cross-sectional diagram taken along the line (A)-(A) of FIG. 3.
Figure 6:
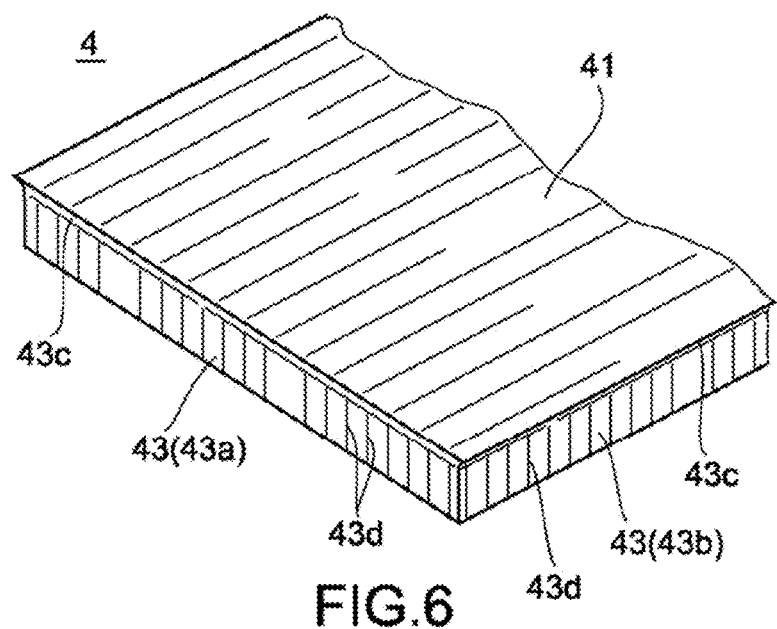
FIG. 6 A perspective view showing a main portion of the light guide plate.

FIG. 2 is a side view of the light guide plate 4, FIG. 3 is a plan view of the light guide plate 4, FIG. 4 is a bottom view of the light guide plate 4, FIG. 5 is a cross-sectional diagram taken along the line (A)-(A) of FIG. 3, and FIG. 6 is a perspective view of a main portion of the light guide plate 4. The light guide plate 4 is constituted of a transparent plastic material such as a polycarbonate resin and an acrylic resin. In this embodiment, the light guide plate 4 is produced by punching out a plastic sheet made of the transparent resin material in a predetermined size. A specific example of the size of the light guide plate 4 is 67 mm (width)×35 mm (height)×0.25 mm (thickness) in this embodiment.

As shown in FIGS. 3 to 5, the light guide plate 4 is constituted of a thin plate including a light guide portion 40 as a main body of the light guide plate, a light-emitting surface 41, a light-reflecting surface 42, and four side surfaces 43. The light-emitting surface 41 and the light-reflecting surface 42 correspond to two main surfaces of the light guide plate 4 opposed to each other. Out of the four side surfaces 43 of the light guide plate 4, one corresponds to a first side surface to be a light-incident surface 43a, and the other three correspond to second side surfaces 43b other than that. The light-incident surface 43a may be a side surface on a short side of the light guide plate 4, or may be a side surface on a long side thereof. The light-reflecting surface 42 and the three side surfaces 43b excluding the light-incident surface 43a of the light guide plate 4 are covered by the reflector plate 6. It should be noted that the light-incident surface 43a side may also be covered by the reflector plate 6.

The four side surfaces 43 of the light guide plate 4 each include a protrusion 43c whose protrusion amount gradually decreases from the light-emitting surface 41 side toward the light-reflecting surface 42 side. The protrusion 43c is formed at an end portion of the light-incident surface 43a on the light-emitting surface 41 side and, particularly in this embodiment, formed continuously along an edge portion of the light-emitting surface 41. As will be described later, those protrusions 43c are formed simultaneously on the side surfaces 43 when the light guide plate 4 is produced by punching out the plastic sheet in a shape of a frame. A press direction is a direction from the light-reflecting surface 42 side to the light-emitting surface 41 side. It should be noted that a surface condition to be described later of the side surfaces 43 including the protrusions 43c is derived from a production method of the light guide plate 4.

The protrusion 43c is substantially triangular, and a protrusion length which is, in this embodiment, about 10 μm, is not particularly limited. A surface of the protrusion 43c on an upper surface side (light-emitting surface 41 side) belongs to the same plane as the light-emitting surface 41, and by being formed continuous with the light-emitting surface 41, the edge portion of the light-emitting surface 41 is formed. A surface of the protrusion 43c on a lower surface side (light-reflecting surface 42 side) is a tapered surface that tilts from the light-emitting surface 41 side toward the light-reflecting surface 42 side. Accordingly, the side surfaces 43 are tapered from a predetermined position in the thickness direction toward the light-emitting surface 41. A ratio of a height of the protrusion 43c to a height of the side surface portion 43 is, for example, 1/10 or less.

As shown in FIGS. 3 and 5, a prism pattern 41a is formed on the light-emitting surface 41 of the light guide plate 4. The prism pattern 41a functions as a light diffusion pattern for diffusing light emitted from the light-emitting surface 41 and is arranged plurally in a direction parallel to one of the side surfaces 43 to be the light-incident surface 43a. The prism patterns 41a may be formed across the entire area of the light-emitting surface 41, or may be formed partially on the light-emitting surface 41. Moreover, instead of the prism pattern, other light diffusion patterns such as a toroidal lens pattern and a lens array pattern may be adopted.

On the other hand, the light-reflecting surface 42 of the light guide plate 4 has a function of reflecting light that has entered the light-incident surface 43a and transmitted through the light guide portion 40 toward the light-emitting surface 41 side. As shown in FIGS. 4 and 5, concave-type curved dot patterns 42a are formed on the light-reflecting surface 42. The dot patterns 42a are for diffusing light reflected by the light-reflecting surface 42 and formed with a higher density so as to shorten a formation interval as a distance thereof from the light-incident surface 43a increases. The dot patterns 42a are not limited to a concave type and may instead be a convex type or a combination of the convex type and the concave type. Even when the entire light-reflecting surface 42 is an embossed surface instead of the dot patterns 42a, the same light diffusion effect can be obtained.

Further, as shown in FIG. 6, a large number of minute streaky concave portions (grooves) 43d are formed on the side surfaces 43 of the light guide plate 4 including the light-incident surface 43a in the thickness direction of the light guide plate 4. Accordingly, a concavoconvex distribution of a surface is formed on the side surfaces 43 in a longitudinal direction. The concave portions 43d may be triangular, flat, or curved. A formation interval of the concave portions 43d may have a regularity, but may also be irregular. Moreover, the side surfaces 43 have a certain degree of surface roughness. Surface roughness may differ between the concave portion and the convex portion of the side surfaces 43. In this case, a roughness degree distribution can be provided to the side surfaces 43 in the longitudinal direction.

The surface roughness of the light-incident surface 43a is not particularly limited. The surface roughness of the light-incident surface 43a can be set within a range of, for example, Ra (centerline mean roughness) 0.2 μm or more to 0.7 μm (Rz (maximum roughness) 2 μm or more and 7 μm or less, Rzjis (10-point mean roughness) 2 μm to 5 μm). Accordingly, it is possible to efficiently scatter light at the light-incident surface 43a and reduce luminance unevenness.

Further, the surface roughness of the light-incident surface 43a may be equal to or smaller than a wavelength of source light. Accordingly, a moth-eye is expressed in the light-incident surface 43a, with the result that a reflection of light entering the light-incident surface 43a can be suppressed and a light use efficiency can be improved. The "moth-eye effect" used herein refers to a reflection prevention function that is expressed when light enters a layer in which a concavoconvex structure (e.g., protrusive structure) is formed in a cycle equal to or smaller than a target light wavelength. Since the concavoconvex structure is recognized by light not as a structure but as a layer whose refractive index changes continuously, an interface reflection is suppressed and a reflection prevention function is expressed.

A roughness degree of the light-incident surface 43a can be adjusted based on a punching condition of the plastic sheet. Further, it is also possible to make an adjustment to a desired roughness degree by subjecting the side surfaces of the punched-out light guide plate 4 to post processing. An example of the processing method is grinding processing using a rotary cutter or a file.

Figure 7:
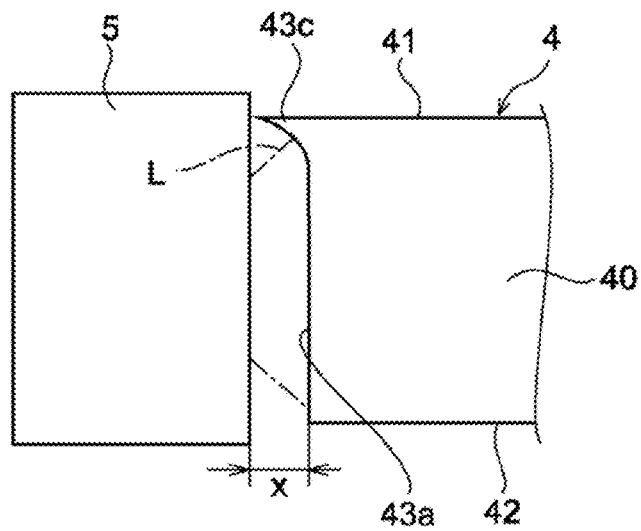
FIG. 7 A side view of a main portion showing a relationship between a light source and a light-incident surface of the light guide plate constituting the liquid crystal display apparatus shown in FIG. 1.

FIG. 7 is a side view of a main portion showing a relationship between the light source 5 and the light-incident surface 43a of the light guide plate 4. The light source 5 is constituted of a light-emitting diode (LED), and a light-emitting surface thereof is opposed to the light-incident surface 43a of the light guide plate 4. In particular, the light source 5 is disposed opposite to the light-incident surface 43a with the protrusion 43c of the light guide plate 4 interposed therebetween, and at least a gap X whose length corresponds to a protrusion length of the protrusion 43c is formed between the light source 5 and the light-incident surface 43a. In this embodiment, the gap X is about 10 μm.

The number of light sources 5 to be disposed on the light-incident surface 43a of the light guide plate 4 and positions thereof are not particularly limited. In this embodiment, a total of three light sources 5 are disposed at regular intervals at a center portion of the light-incident surface 43a and both sides thereof. Also, a size and thickness (height) of an LED chip constituting each light source 5 are not particularly limited. For the LED chip, a white LED that emits white light is used. It should be noted that it is also possible to use LED chips of three colors of red (R), green (G), and blue (B) and form a white color by mixing them in the light guide plate 4.

The liquid crystal display apparatus 1 of this embodiment is structured as described above. Next, a basic operation of the liquid crystal display apparatus 1 will be described.

Light emitted from the light source 5, that has entered the light-incident surface 43a of the light guide plate 4 propagates inside the light guide portion 40 by repeating a total reflection on inner surfaces of the light-emitting surface 41 and the light-reflecting surface 42. Since a total reflection condition is invalidated regarding light diffused by the dot patterns 42a on the light-reflecting surface 42, light is emitted from the light-emitting surface 41. In particular, because the dot patterns 42a are formed to have a higher density as a distance from the light source 5 increases, it is possible to emit light from the light-emitting surface 41 with a practically-uniform luminance distribution within a plane of the light guide plate 4.

Moreover, since the prism patterns 41a are formed on the light-emitting surface 41, light emitted from the light-emitting surface 41 is diffusively emitted while spreading a certain degree. In addition, light that has leaked from the light-reflecting surface 42 and the side surfaces 43b of the light guide plate 4 is reflected by the reflector plate 6 to reenter the light guide plate 4. Accordingly, a light use efficiency can be improved.

Light emitted from the light-emitting surface 41 of the light guide plate 4 enters the liquid crystal display panel 2 via the diffusion sheet 8 and the light collection sheet 9. The diffusion sheet 8 uniformly diffuses light emitted from the light guide plate 4, thus raising uniformity of luminance within the plane. The light collection sheet 9 collects the light emitted from the diffusion sheet 8 in a front direction and causes the light to enter the liquid crystal display panel 2, thus improving front luminance of the liquid crystal display panel 2. Light that has entered the liquid crystal display panel 2 is emitted to a viewer side via a color filter (not shown) after a transmission amount thereof is controlled for each pixel. As a result, a color image is displayed on a front surface of the liquid crystal display panel 2.

Next, the light guide plate 4 according to the embodiment of the present invention will be described in detail.

As described above, the light guide plate 4 of this embodiment includes the protrusion 43c at the end portion of the side surface 43 constituting the light-incident surface 43a on the light-emitting surface 41 side. Therefore, between the light-incident surface 43a and the light source 5 disposed opposite to the light-incident surface 43a, a gap X corresponding to a protrusion length of the protrusion 43c is formed as shown in FIG. 7. Light emitted from a light-emitting diode normally has a directivity and propagates in a fan-like manner from the light-incident surface 43a inside the light guide portion 40. In this embodiment, by forming the gap X, light (hereinafter, referred to as "incident light") L emitted from the light source 5 to enter the light-incident surface 43a enters the light-incident surface 43a while being spread a certain degree. Accordingly, a directivity of the incident light L can be relieved, and a generation of a bright spot on the light-incident surface 43a at a position where the light source 5 is disposed can be suppressed as compared to a case where the light source 5 is disposed while being in contact with the light-incident surface 43a.

Moreover, because light can be diffused in a wide range in the vicinity of the light-incident surface 43a, it becomes possible to increase an amount of light that propagates among four corner positions of the light guide plate 4 and the light sources 5, enhance uniformity of light that is transmitted inside the light guide portion 40, and improve an in-plane luminance distribution. Furthermore, since an amount of light that directly reaches the side surfaces 43b on both sides orthogonal to the light-incident surface 43a and the side surface 43b opposed to the light-incident surface 43a can be reduced, an amount of light that is transmitted outwardly from those side surfaces 43b is reduced. As a result, it becomes possible to improve a light use efficiency.

In addition, in the light guide plate 4 of this embodiment, since the light-incident surface 43a of the light guide plate 4 has adequate surface roughness, the incident light L can be somewhat scattered at the light-incident surface 43a to lose its directivity. As a result, it becomes possible to realize a more-uniform light transmission distribution in the light guide portion 40. Moreover, by distributing the surface roughness of the light-incident surface 43a in the longitudinal direction with adequate randomness, the effect described above can be additionally enhanced. Such an effect becomes more prominent as a plate thickness of the light guide plate 4 decreases.

Figure 8:
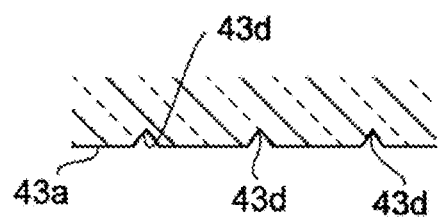
FIG. 8 A plan view of a main portion of the light-incident surface of the light guide plate.

FIG. 8 is an enlarged plan view of a main portion of the light-incident surface 43a of the light guide plate 4. Since a large number of minute streaky concave portions 43d are formed on the light-incident surface 43a, the light-incident surface 43a functions to spread incident light L in various directions within the plane as shown in FIG. 8. As a result, the effect of killing a directivity of the incident light L at the light-incident surface 43a can be enhanced, and a light transmission distribution in the light guide portion 40 can be additionally improved. Moreover, since the concave portions 43d are formed along the thickness direction of the light guide plate 4, a light diffusion in the thickness direction of the light guide plate 4 is suppressed. Accordingly, lowering of a total reflection efficiency of light that is transmitted through the light guide portion 40 is suppressed. Thus, it becomes possible to enhance in-plane uniformity of an emission intensity without impairing a light use efficiency.

On the other hand, due to the gap X between the light-incident surface 43a of the light guide plate 4 and the light sources 5, components of incident light L leaked from the light sources 5 to the light-emitting surface 41 side may be generated. However, since the protrusion 43c is formed on the light-incident surface 43a of the light guide plate 4 in this embodiment, a function of blocking a leak of incident light L can be obtained by the protrusion 43c.

Figure 9:
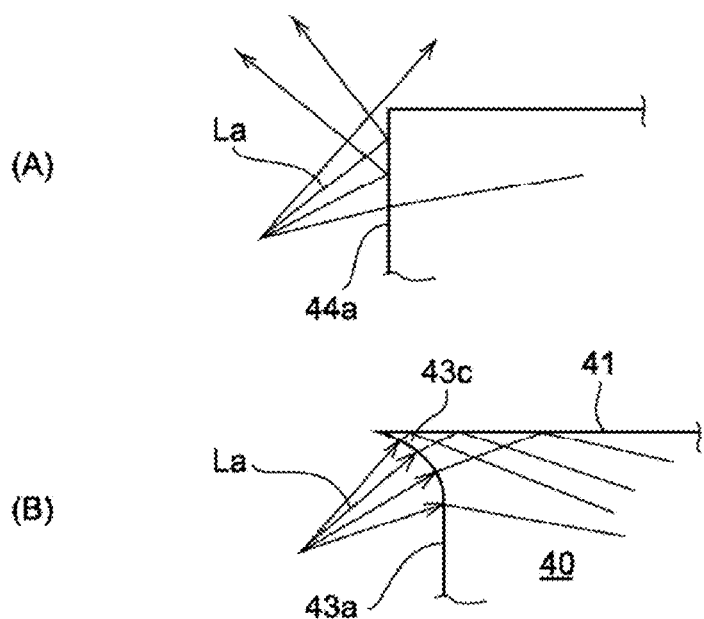

FIG. 9(A) shows a light-incident surface 44a without the protrusion 43c. In this case, incident light components La that are reflected by an upper portion of the light-incident surface 43a and leaked outwardly appear, thus lowering a light use efficiency. In contrast, according to the light-incident surface 43a including the protrusion 43c as shown in FIG. 9(B), the incident light components La traveling toward the upper portion of the light-incident surface 43a can be effectively led inside the protrusion 43c. Light that has entered the protrusion 43c is transmitted through the protrusion 43c and totally reflected by an inner surface of the light-emitting surface 41, to thus be propagated inside the light guide portion 40. Since the incident light components La emitted toward the upper portion of the light-incident surface 43a can be effectively blocked by the protrusion 43c as described above, a light use efficiency can be improved.

Figure 10:
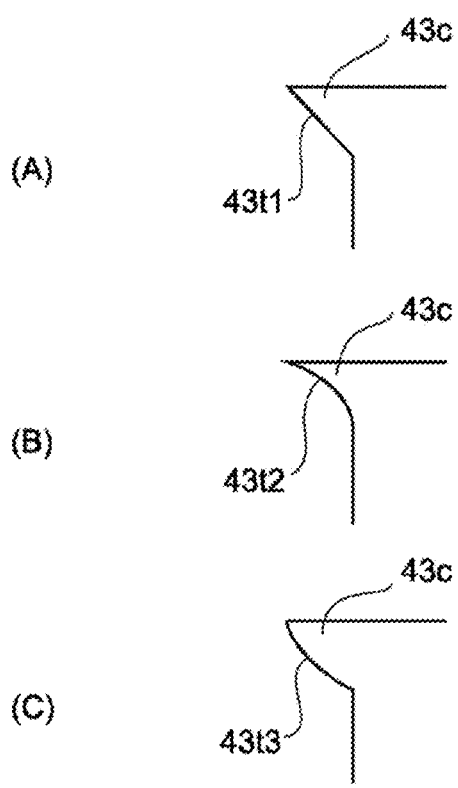
FIG. 10 Side views of a main portion showing examples of shapes of the protrusion.

For enhancing such a blocking effect of the protrusion 43c, the protrusion 43c can be formed in shapes shown in FIGS. 10(A) to 10(C). FIG. 10(A) shows an example where the protrusion 43c has a flat tapered surface 43t1 having a constant slope, and FIGS. 10(B) and (C) show respective examples where the protrusion 43c has curved tapered surfaces 43t2 and 43t3 whose slopes change gradually.

On the other hand, in the light guide plate 4 of this embodiment, since the three side surfaces 43b other than the light-incident surface 43*a* also have the same structure as the light-incident surface 43*a*, the following effects can be obtained.

First, since each of the side surfaces 43*b* has adequate surface roughness or roughness distribution, light that has transmitted through the light guide portion 40 and reached the side surfaces 43*b* can be randomly diffused and reflected. Consequently, in-plane luminance uniformity of the light-emitting surface 41 can be enhanced. Further, it becomes possible to reduce an amount of light that is transmitted through the side surfaces 43*b* to thus improve a light use efficiency. Furthermore, an adequate light scattering effect can be obtained when light is reflected by the reflector plate 6 and reenters the light guide plate 4.

Second, since each of the side surfaces 43*b* includes minute streaky concave portions 43*d* along the thickness direction, in addition to the effect described above, a reflection scattering efficiency within a main surface of the light guide plate 4 can be improved. Accordingly, in-plane uniformity of light emitted from the light-emitting surface can be enhanced.

Figure 11:
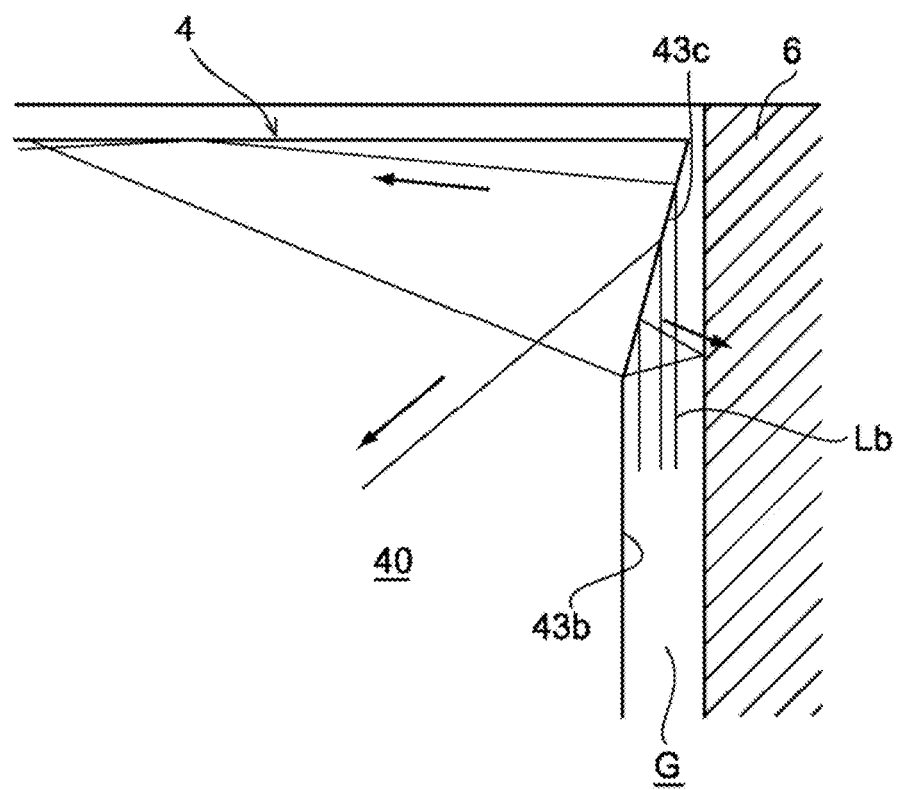
FIG. 11 A side view of a main portion showing a relationship between a side surface of the light guide plate and a reflector plate constituting the liquid crystal display apparatus shown in FIG. 1.

Third, since each of the side surfaces 43*b* includes the protrusion 43*c* on the light-emitting surface 41 side, light that is propagated in a front direction within a gap formed between the side surfaces 43*b* of the light guide plate 4 and the reflector plate 6 can be captured by the protrusions 43*c* and caused to reenter the light guide portion 40. FIG. 11 is a cross-sectional diagram of a main portion of the backlight unit 7 showing that state. Light Lb that is propagated in a front direction (upward in the figure) in a gap G formed between the side surface 43*b* of the light guide plate 4 and the reflector plate 6 enters the protrusion 43*c* of the side surface 43*b* and is diffused by a surface effect of the protrusion 43*c* having adequate roughness. Accordingly, a biased rise of luminance at circumferential edge portions of the light guide plate 4 can be relieved, and a luminance distribution can be improved.

Figure 15:
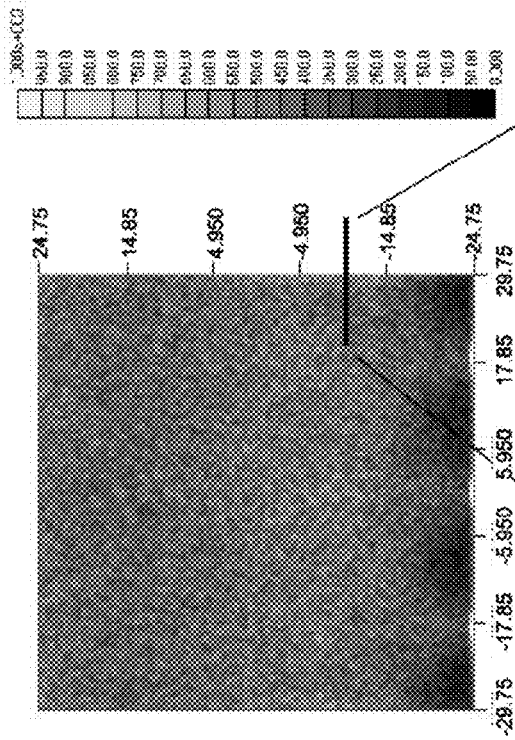
Figure 15:
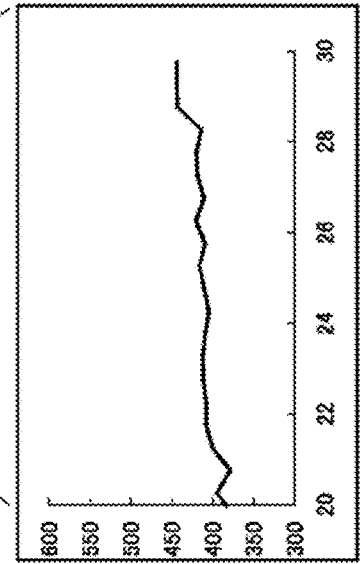
Figure 15:
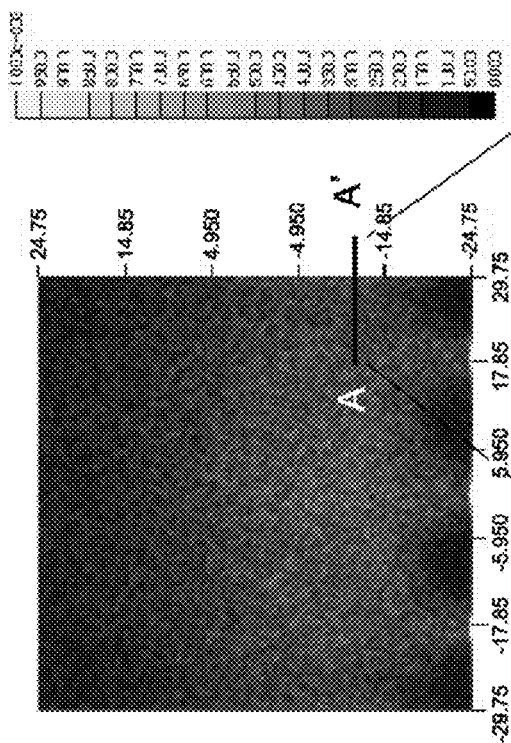
Figure 15:
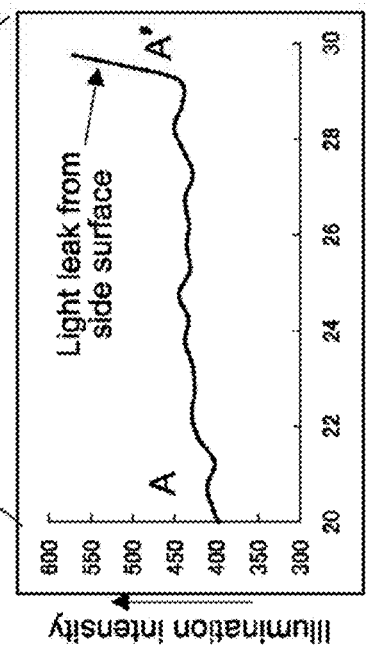

Differences in optical characteristics of a light guide plate due to presence/absence of the protrusion 43*c* are shown in FIGS. 15(A) and (B). FIG. 15(A) shows a simulation result of a light guide plate structure having no protrusion 43*c* on a side surface as a model, and FIG. 15(B) shows a simulation result of the light guide plate structure of this embodiment including the protrusion 43*c* on the side surface as a model. By the thus-structured protrusions being formed on the side surfaces of the light guide plate, it becomes possible to suppress a light leak from the side surfaces of the light guide plate as well as cause light to reach an entire area of the light-emitting surface to improve an in-plane luminance distribution.

Since the light guide plate 4 of this embodiment has light guide characteristics as described above, a surface-emitting apparatus 3 and a liquid crystal display apparatus 1 having a high light use efficiency and excellent in-plane luminance distribution can be obtained. Moreover, since the light guide plate 4 is formed to be 0.30 mm or less, which is extremely thin, a large contribution can be made to thinning of the surface-emitting apparatus 3 and the liquid crystal display apparatus 1.

Next, a production method of the light guide plate 4 of this embodiment will be described.

The production method of the light guide plate 4 of this embodiment includes the steps of preparing a plastic sheet made of a translucent resin and punching out the plastic sheet in a shape of a frame to shape the light guide plate 4. The plastic sheet as a base material of the light guide plate 4 is produced by various forming methods such as melt extrusion, hot press, and roll forming. It should be noted that the plastic sheet may be prepared by purchasing a commercially-available product.

Figure 12:
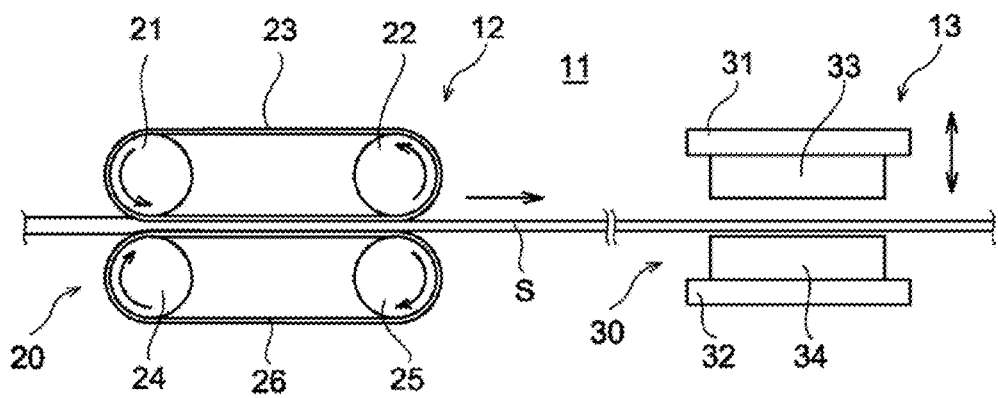
FIG. 12 A schematic structural diagram of a light guide plate production apparatus for explaining a method of producing a light guide plate according to the embodiment.

FIG. 12 is a schematic structural diagram of a light guide plate production apparatus 11 used in this embodiment. The light guide plate production apparatus 11 includes a sheet forming portion 12 and a punching press portion 13.

A forming machine 20 is provided in the sheet forming portion 12. The forming machine 20 includes a heating roll 21, a cooling roll 22, and a first endless belt 23 wound around the heating roll 21 and the cooling roll 22. The heating machine 20 also includes a first nip roll 24 opposed to the heating roll 21, a second nip roll 25 opposed to the cooling roll 22, and a second endless belt 26 wound around the first and second nip rolls 24 and 25.

A certain gap is formed between the first endless belt 23 and the second endless belt 26. A long plastic sheet S having a predetermined thickness (e.g., 0.30 mm or less) is formed by supplying a translucent resin material between the endless belts 23 and 26 running in the same direction. Moreover, by forming geometrical patterns constituted of prism patterns on a surface (forming surface) of the first endless belt 23, prism patterns (41*a*) can be formed on one of the surfaces (upper surface in FIG. 12) of the plastic sheet S simultaneous with the formation of the plastic sheet S. In addition, by forming geometrical patterns constituted of convex- or concave-type curved dot patterns on a surface (forming surface) of the second endless belt 26, concave- or convex-type curved dot patterns (42*a*) can be transferred onto the other surface (lower surface in FIG. 12) of the plastic sheet S simultaneous with the formation of the plastic sheet S.

Figure 13:
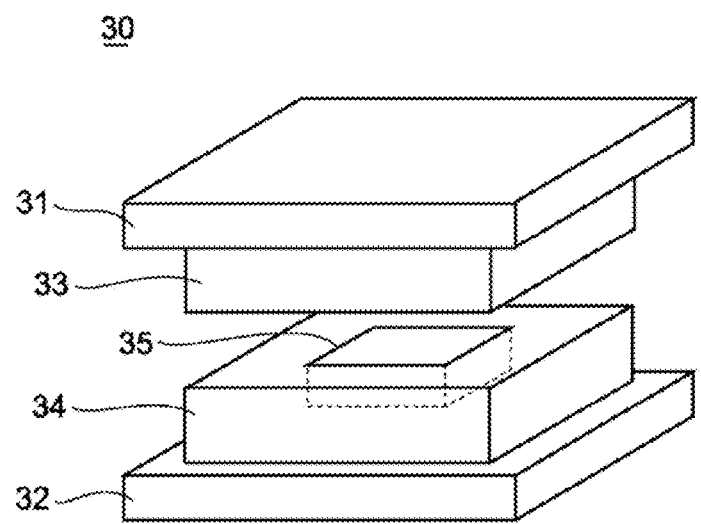
FIG. 13 A perspective view showing a schematic structure of a punching press machine that constitutes a punching press portion of the light guide plate production apparatus.

A punching press machine 30 shown in FIG. 13 is provided in the punching press portion 13. The punching press machine 30 includes a movable die 31 positioned on an upper surface side of the plastic sheet S and a fixed die 32 positioned on a lower surface side of the plastic sheet S. The movable die 31 is structured to be movable in a vertical direction with respect to the fixed die 32. Buffer members 33 and 34 are respectively provided on inner sides of the movable die 31 and the fixed die 32. In particular, a frame-like punching blade (Victoria blade) 35 is embedded in the buffer member 34 on the fixed die 32 side.

The punching press machine 30 presses the plastic sheet S supplied between the movable die 31 and the fixed die 32 from top and bottom. At this time, the punching blade 35 embedded in the buffer member 34 approaches the plastic sheet S from the lower surface and produces a sheet piece having an outer shape corresponding to the shape of the punching blade 35. The produced sheet piece constitutes the light guide plate 4 of this embodiment.

Punched-out cross-sectional portions of the sheet piece formed by the punching press machine 30 constitute the side surfaces 43 of the light guide plate 4 having the surface condition as shown in FIGS. 2 to 6. In other words, the protrusions 43*c* of the side surfaces 43 are formed in the vicinity of the upper surface of the plastic sheet S at a final stage of the punching step. The protrusions 43*c* are formed by being mechanically severed unlike the cutting work by the punching blade 35 and protrude outwardly from the cut cross sections. The protrusions 43*c* are formed inevitably on the punched-out cross sections in the punching step of the plastic sheet S.

Moreover, the surface roughness of the side surfaces 43 of the light guide plate 4 is unique to the punched-out cross-sectional portions that are inevitably formed at a time of cutting the plastic sheet S by the punching blade 35. Therefore, it becomes possible to adjust the surface roughness of the side surfaces 43 depending on a constituent material of the plastic sheet S, sharpness of the punching blade 35, a pressing pressure, and the like. The same holds true for the streaky concave portions 43d formed on the side surfaces 43 of the light guide plate 4. A direction in which the concave portions 43 are formed is based on a punching direction of the light guide plate 4 (thickness direction of light guide plate 4).

In the light guide plate 4 produced as described above, a surface of the punched-out cross section on a side on which the protrusions 43c are formed (upper surface of plastic sheet S) is used as the light-emitting surface 41, and the other side is used as the light-reflecting surface 42. It should be noted that since the side surface portions of the light guide plate 4 all have the same surface condition, any of the surfaces can be used as the light-incident surface 43a.

According to this embodiment, since the light guide plate 4 is produced by a punching press method, an ultra-thin light guide plate 4 of, for example, 0.30 mm or less, which cannot be produced by an injection molding method, can be easily produced.

Moreover, it is possible to significantly raise productivity as well as suppress a cost of production of the light guide plate 4 at a low cost. Further, by changing a size of the punching blade 35, it becomes possible to easily cope with productions of light guide plates that support various screen sizes.

Furthermore, according to this embodiment, since the side surfaces of the light guide plate 4 are constituted of punched-out cross sections, various optical characteristics described above can be easily realized. In other words, the light guide plate 4 can be provided for practical use with the side surfaces being used as they are as punched-out cross sections, without any particular processing after the punching.

Figure 14:
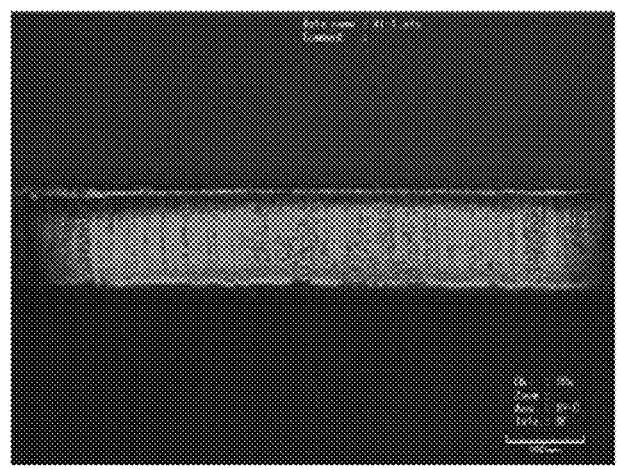
FIG. 14 Sample photographs of a side surface (punched-out cross section) of the light guide plate produced by a punching press process.
Figure 14:
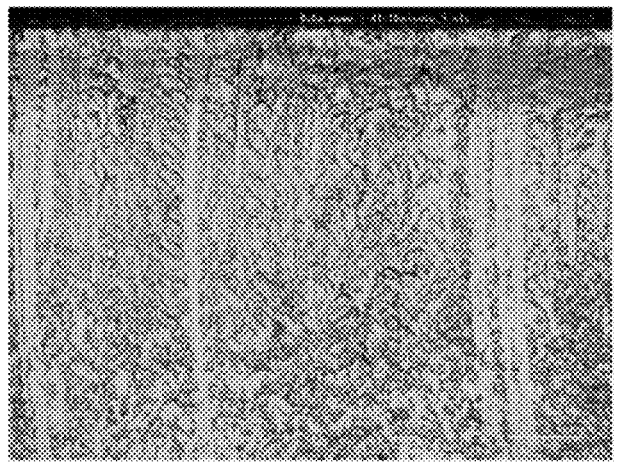
Figure 14:
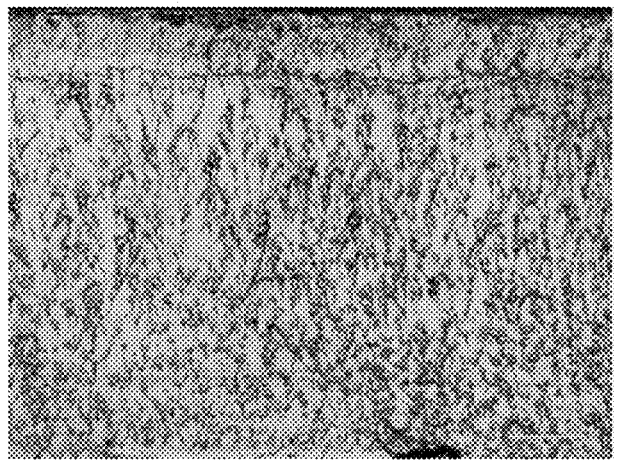

FIG. 14(A) shows a sample photograph of a side surface (punched-out cross section) of a light guide plate obtained by punching out a polycarbonate sheet having a thickness of 0.25 mm in a predetermined size. In the punched-out cross section, minute streaky concave portions (grooves) extending in a thickness direction of the light guide plate can be recognized. FIG. 14(B) shows an enlarged photograph of a part of the cross section that is formed streakily in FIG. 14(A), and FIG. 14(C) is an enlarged photograph of a part of the cross section that is formed non-streakily in FIG. 14(A).

As described above, the side surfaces of the light guide plate produced by the punching press process have surface configurations attributable to its processing method. The surface configurations provide various optical functions advantageous as a light guide plate as described above. Moreover, since an extremely-thin light guide plate can be produced by the punching press process, it becomes possible to make a large contribution to thinning of a surface-emitting apparatus and liquid crystal display apparatus that are equipped with the light guide plate.

For example, in the above embodiment, the light guide plate 4 has been produced by the punching press process method. However, it is also possible to produce the light guide plate 4 by an injection molding method depending on a thickness of the light guide plate 4. In this case, formations of the protrusions 43c and the concave portions 43d can be handled by processing an inner surface of a die. In addition to the case of processing an inner surface of a die, the side surfaces 43 can also be roughened by subjecting the side surfaces of the light guide plate to chemical processing, blast processing, grinding processing, and the like after the molding.

Figure 16:
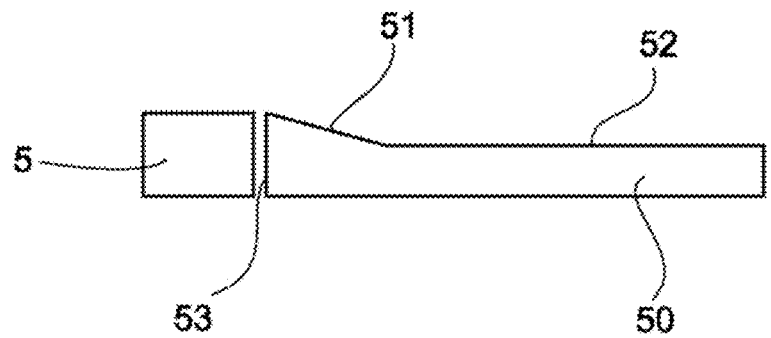
FIG. 16 A side view showing a modified example of the structure of the light guide plate.

Moreover, the shape of the light guide plate 4 is not limited to a simple plate as described above, and the embodiment is also applicable to a wedge-like light guide plate whose plate thickness gradually decreases as a distance from an incident surface side increases. Further, as shown in FIG. 16, the present invention is also applicable to a light guide plate 50 whose upper surface is constituted of a tilted portion 51 and a flat portion 52. Accordingly, a thin light guide plate that uses the flat portion 52 as a light-emitting surface can be structured while enabling an incident surface 53 to be formed with a thickness corresponding to a size of the light source 5.

Furthermore, in the above embodiment, the example in which the protrusion 43c is formed on all of the four side surfaces 43 of the light guide plate 4 including the light-incident surface 43a has been described. Alternatively, the present embodiment is also applicable to an example in which the protrusion 43c is formed only on the light-incident surface 43a or an example in which the protrusion 43c is formed on at least one of the side surfaces 43b except the light-incident surface 43a.

On the other hand, the light-incident surface 43a may have a concavoconvex shape exemplified by a prism and a lens. Accordingly, a predetermined light diffusion effect can be expressed in the light-incident surface 43a to thus reduce luminance unevenness. As the concavoconvex shape, there is a prism surface constituted of a plurality of rows of prisms arranged along a longitudinal direction (width direction) of the light-incident surface 43a. The concavoconvex shape of the light-incident surface can be obtained by, for example, imparting a concavoconvex shape to an inner surface of a tip end of a punching blade or shaping a tip end of a blade in a waveform.

Figure 17:
FIG. 17 A diagram showing a modified example of a shape of a light-incident surface according to another embodiment.
Figure 18:
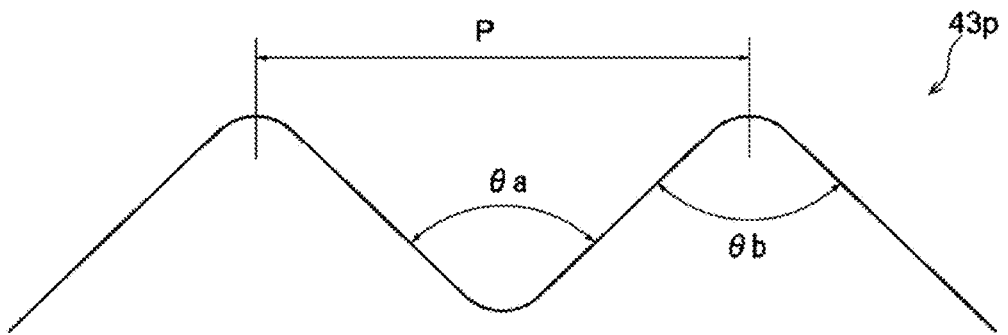
FIG. 18 An enlarged view showing a main portion of FIG. 17.

FIG. 17 is a partial plan view showing an example of a light-incident surface constituted of the prism surface, and FIG. 18 is an enlarged view thereof. A light-incident surface 43p includes a concavoconvex structural surface in which roughly-isosceles-triangular prisms are arranged cyclically in a width direction. An arrangement pitch, height, apex angle, and inter-prism angle of prisms can be set as appropriate based on a size of a light guide plate, an arrangement interval of light sources, the number of light sources disposed, required luminance characteristics, and the like.

Figure 19:
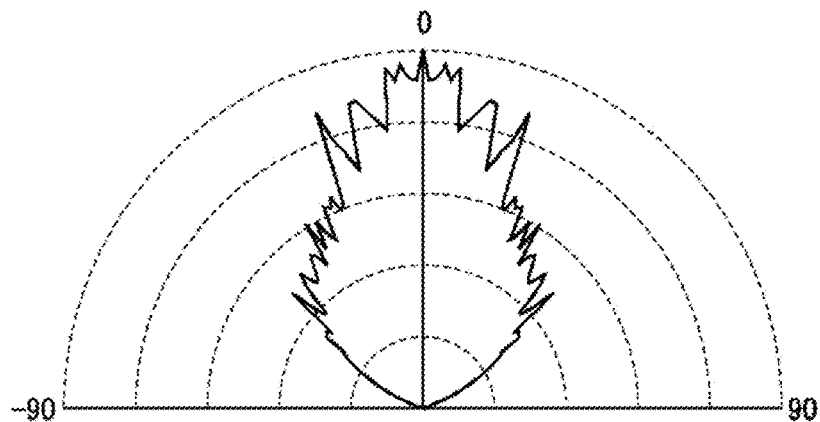
FIG. 19 A simulation result showing a light distribution per light source with respect to the light guide plate including the light-incident surface having the structure shown in FIG. 17.

For example, a prism arrangement pitch P can be set to be 0.1 mm or more and 5.0 mm or less, a height H can be set to be 0.05 mm or more and 2.5 mm or less, and an apex angle θa and inter-prism angle θb can be set to be 60° or more and 150° or less. An apex of a prism and a groove between prisms do not need to be sharp and may be curved as shown in FIG. 18. A curvature radius of the apex and groove of prisms can be set to be, for example, 0.05 mm or more. FIG. 19 shows an example of a light distribution of a light guide plate including the prism-like light-incident surface 43p. The example in the figure shows a simulation result of a light distribution per light source with respect to the light-incident surface 43p in which the apex angle θa and inter-prism angle θb are 120°, the pitch P is 0.7 mm, and the curvature radius of the apex and groove of prisms is 0.15 mm. The example above can be applied to, for example, a surface light source in which 5 light sources are disposed at 8.6 mm-intervals.

When producing the light-incident surface 43p constituted of a prism surface by punching press, minute streaky concave portions are formed on the prism surface along the thickness direction as described above. In this case, a double light diffusion effect attributable to the light diffusion effect at the concave portions and the refraction effect at the prism surface of the light-incident surface 43p can be obtained. As a result, luminance unevenness can be additionally reduced and a surface light source having excellent luminance uniformity can be structured.

Figure 20:
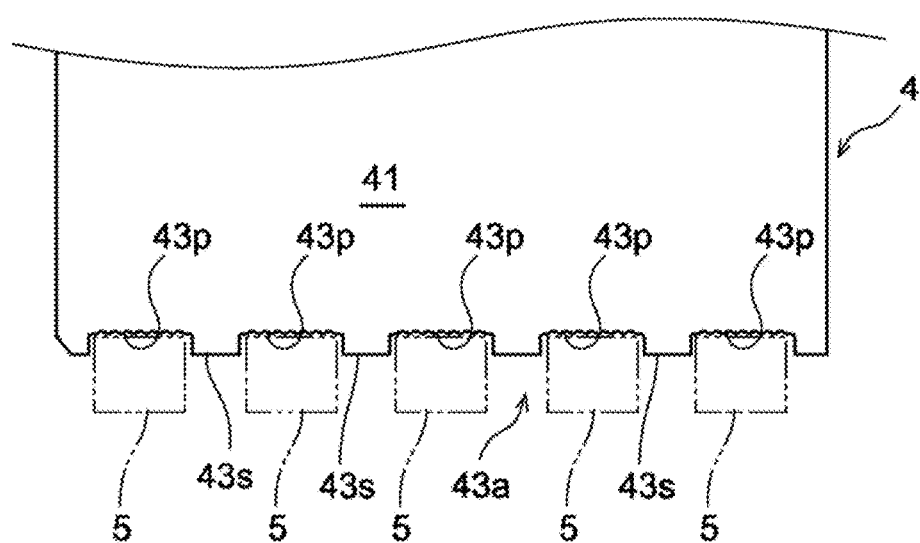
FIG. 20 A diagram showing a modified example of a shape of a light-incident surface according to another embodiment.

FIG. 20 is a partial plan view showing another modified example of the structure of the light-incident surface 43a of the light guide plate 4. In this example, the light-incident surface 43a includes a plurality of convex portions 43s defining an area where the light sources 5 are disposed. Accordingly, positioning accuracy of the light sources 5 with respect to the light-incident surface 43a can be enhanced. Intervals between the convex portions 43s and the number thereof are set as appropriate based on a size of the light sources 5, the number thereof, and the like. Moreover, areas between the convex portions 43s can be formed by the prism surface 43p described above, for example.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A light guide plate comprising:
    a light-emitting surface;
    a light-reflecting surface opposed to the light-emitting surface; and
    a light-incident surface including a side surface portion formed in a thickness direction and a protrusion whose protrusion amount gradually decreases from the light-emitting surface side toward the light-reflecting surface side, the protrusion being formed at an end portion of the side surface portion only on the light-emitting surface side,
    wherein the protrusion is formed continuously on the light-incident surface along an edge portion of the light-emitting surface, and
    wherein the light guide plate has a thickness of 0.30 mm or less.

2. The light guide plate according to claim 1,
    wherein the light-incident surface includes a large number of streaky concave portions extending from the light-reflecting surface side toward the light-emitting surface side.

3. The light guide plate according to claim 1,
    wherein the light-incident surface has a roughness degree distribution along a longitudinal direction of the light-incident surface.

4. The light guide plate according to claim 1,
    wherein the light-incident surface is a prism surface including of a plurality of rows of prisms arranged along a longitudinal direction of the light-incident surface.

5. The light guide plate according to claim 4,
    wherein the prism surface includes a large number of streaky concave portions extending from the light-reflecting surface side toward the light-emitting surface side.

6. The light guide plate according to claim 1,
    wherein the protrusion includes a tapered surface that tilts from the light-emitting surface side toward the light-reflecting surface side.

7. The light guide plate according to claim 1,
    wherein the light-reflecting surface includes curved dot patterns that are formed with a higher density as a distance thereof from the light-incident surface increases.

8. The light guide plate according to claim 1,
    wherein the light-emitting surface includes prism patterns arranged in a direction parallel to the light-incident surface.

9. A light guide plate comprising:
    a light-emitting surface;
    a light-reflecting surface opposed to the light-emitting surface; and
    four side surfaces including a light-incident surface, that each include a side surface portion formed in a thickness direction and a protrusion whose protrusion amount gradually decreases from the light-emitting surface side toward the light-reflecting surface side, each of the protrusions being formed at an end portion of the side surface portion only on the light-emitting surface side,
    wherein the protrusions are formed continuously on the light-incident surface on the side surfaces along an edge portion of the light-emitting surface, and
    wherein the light guide plate has a thickness of 0.30 mm or less.

10. The light guide plate according to claim 9,
    wherein the four side surfaces include a large number of streaky concave portions extending from the light-reflecting surface side toward the light-emitting surface side.

* * * * *